US012492818B2

United States Patent
Päykkönen et al.

(10) Patent No.: US 12,492,818 B2
(45) Date of Patent: Dec. 9, 2025

(54) METHOD FOR REDUCING COMBUSTION TEMPERATURE AND THERMAL RADIATION WITHIN A LIME KILN

(71) Applicant: ANDRITZ OY, Helsinki (FI)

(72) Inventors: Jari Päykkönen, Kotka (FI); Nina Venäläinen, Kotka (FI)

(73) Assignee: Andritz Oy, Helsinki (FI)

( * ) Notice: Subject to any disclaimer, the term of this patent is extended or adjusted under 35 U.S.C. 154(b) by 530 days.

(21) Appl. No.: 17/916,468

(22) PCT Filed: Apr. 5, 2021

(86) PCT No.: PCT/FI2021/050249
§ 371 (c)(1),
(2) Date: Sep. 30, 2022

(87) PCT Pub. No.: WO2021/198571
PCT Pub. Date: Oct. 7, 2021

(65) Prior Publication Data
US 2023/0144517 A1  May 11, 2023

(30) Foreign Application Priority Data

Apr. 3, 2020 (FI) ...................................... 20205348

(51) Int. Cl.
*F23N 5/00* (2006.01)
*C04B 2/02* (2006.01)
(Continued)

(52) U.S. Cl.
CPC ................ *F23N 5/265* (2013.01); *C04B 2/02* (2013.01); *C04B 2/104* (2013.01); *C04B 7/4438* (2013.01);
(Continued)

(58) Field of Classification Search
CPC .. F23N 5/003; F23N 5/265; F27B 7/34; F27B 7/36; F27B 7/362; F27B 7/3205; F27B 2007/3241
(Continued)

(56) References Cited

U.S. PATENT DOCUMENTS 3,074,707 A * 1/1963 Humphries ............... F27B 7/34
432/19
3,302,938 A * 2/1967 Bendy ...................... F27D 3/18
106/770
(Continued)

FOREIGN PATENT DOCUMENTS

| CN | 101233377 A | 7/2008 |
|---|---|---|
| CN | 105889933 | 8/2016 |

(Continued)

OTHER PUBLICATIONS

International Search Report for PCT/FI2021/050249, mailed Jul. 8, 2021, 3 pages.
(Continued)

*Primary Examiner* — Ko-Wei Lin
(74) *Attorney, Agent, or Firm* — Nixon & Vanderhye P.C.

(57) ABSTRACT

A method for reducing combustion temperature and/or thermal radiation within a lime kiln of a pulp production plant, which kiln is a rotary kiln having a kiln tube (1) internally covered with refractory tiles (13) and having a burner (2) supplied by fuel for heating of the rotary kiln by a flame (3). The effects are achieved by supplying calcium carbonate containing particles to the flame (3) and/or to surrounding area around the flame (3). The particles are supplied into the rotary kiln by at least one lance (9) to the upper part of the flame (3). Calcium oxide containing particles may be supplied to the rotary kiln to areas surrounding the flame (3) for reducing the thermal radiation to an area over the flame (3)
(Continued)

Figure 1:
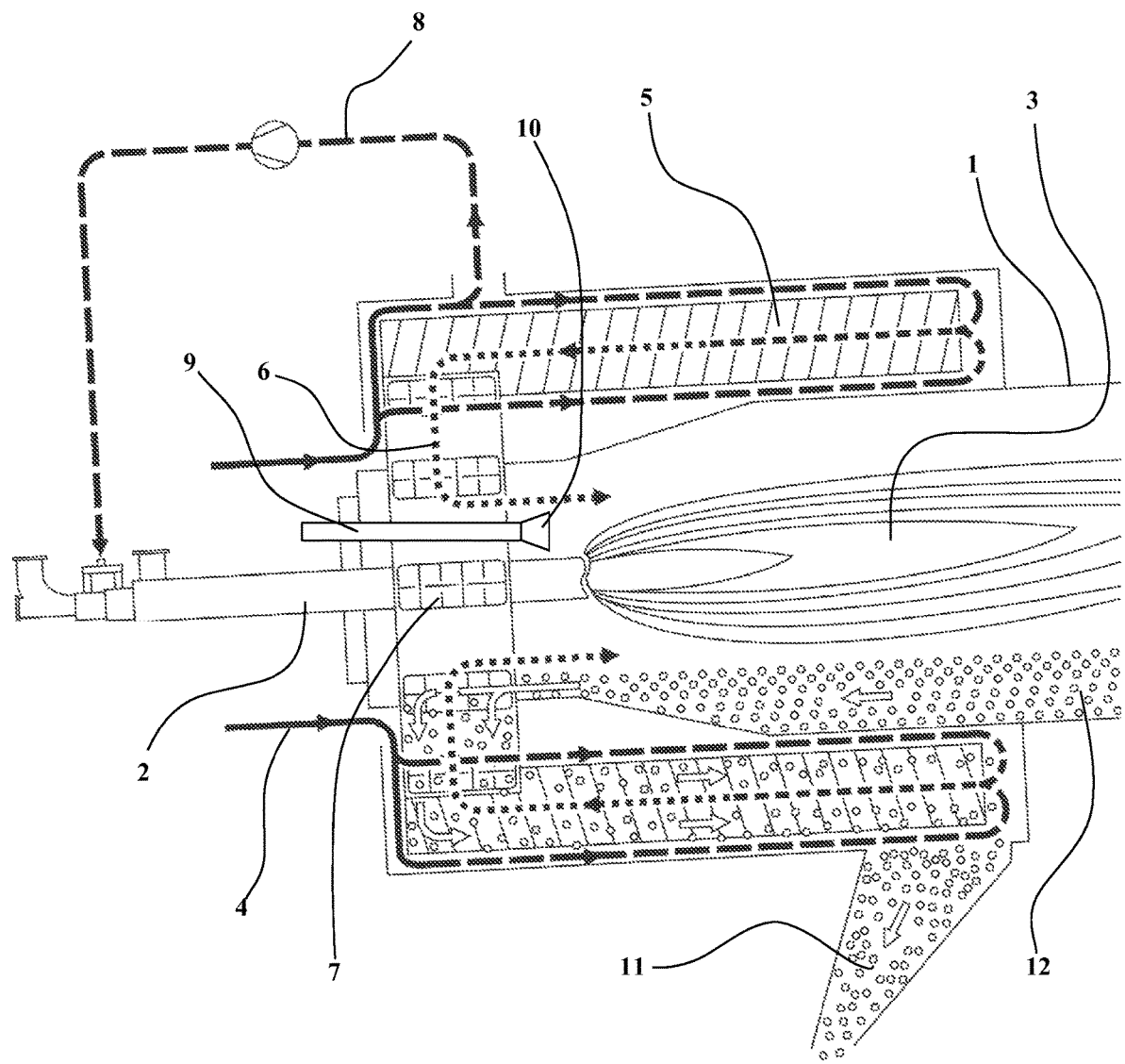

and/or to the area at the side of the flame (3), where the refractory tiles (13) of the kiln are rotating downwards.

15 Claims, 2 Drawing Sheets

(51) Int. Cl.
    *C04B 2/10*     (2006.01)
    *C04B 7/44*     (2006.01)
    *F23L 7/00*     (2006.01)
    *F23N 5/26*     (2006.01)

(52) U.S. Cl.
    CPC ............... *F23L 7/00* (2013.01); *F23N 5/003* (2013.01); *F23N 2900/05003* (2013.01)

(58) Field of Classification Search
    USPC .................................................. 432/108–119
    See application file for complete search history.

(56) References Cited

U.S. PATENT DOCUMENTS

| | | | | |
|---|---|---|---|---|
| 4,260,372 | A * | 4/1981 | Keller | F27B 7/04 432/103 |
| 4,600,438 | A * | 7/1986 | Harris | F23K 1/00 106/758 |
| 4,650,413 | A * | 3/1987 | Olsson | F23D 1/00 60/39.77 |
| 4,848,751 | A * | 7/1989 | Lutgen | F27D 99/00 266/225 |
| 4,934,931 | A * | 6/1990 | Angelo | F23J 7/00 110/263 |
| 5,000,462 | A * | 3/1991 | Trozzi | B02C 17/18 241/179 |
| 5,087,171 | A | 2/1992 | Dosch et al. | |
| 5,572,938 | A * | 11/1996 | Leger | F27B 7/362 432/118 |
| 5,667,582 | A | 9/1997 | Ziegler et al. | |
| 5,711,018 | A * | 1/1998 | Hittner | C03B 5/237 588/415 |
| 5,746,144 | A | 5/1998 | Breen et al. | |
| 6,241,514 | B1 * | 6/2001 | Joshi | F27B 7/362 432/105 |
| 6,254,665 | B1 * | 7/2001 | Matsushita | C21B 13/10 75/484 |
| 7,452,203 | B2 * | 11/2008 | Laux | F27B 7/36 432/103 |
| 7,947,242 | B2 * | 5/2011 | Saito | F27B 7/20 432/103 |
| 2005/0100503 | A1 * | 5/2005 | Feng | C01F 11/08 422/168 |
| 2008/0032247 | A1 * | 2/2008 | Nolan | F27B 7/3205 432/14 |
| 2016/0046524 | A1 * | 2/2016 | Colannino | F27B 7/10 44/628 |
| 2016/0107914 | A1 * | 4/2016 | Baker | F23D 14/22 431/355 |
| 2019/0093950 | A1 * | 3/2019 | Peltonen | F27B 7/362 |
| 2022/0220034 | A1 * | 7/2022 | Perrino | E04F 15/12 |

FOREIGN PATENT DOCUMENTS

| | | |
|---|---|---|
| CN | 106440770 A | 2/2017 |
| JP | S5885392 | 5/1983 |
| JP | 2001316993 | 11/2001 |
| WO | 199203611 | 3/1992 |

OTHER PUBLICATIONS

Written Opinion of the ISA for PCT/FI2021/050249, mailed Jul, 8, 2021, 8 pages.
Japanese Patent App. 2021-530847, Office Action (Jun. 30, 2023(8 pages).
Chinese Office Action with English Translation cited in Application No. 202180025990.2 mailed Mar. 26, 2025, 12 pages.

* cited by examiner

METHOD FOR REDUCING COMBUSTION TEMPERATURE AND THERMAL RADIATION WITHIN A LIME KILN

RELATED APPLICATION

This application is the U.S. national phase of International Application PCT/FI2021/050249, filed Apr. 5, 2021 which designated the U.S. and claims priority to Finnish patent application FI 20205348, filed Apr. 3, 2020, the entire contents of each of which are hereby incorporated by reference.

FIELD OF INVENTION

The invention relates to a method for reducing combustion temperature and thermal radiation within a lime kiln of a pulp production plant.

BACKGROUND OF THE INVENTION

Lime reburning is performed at high temperatures well over 900 degrees Celsius. Thus the flame temperature will always be so high that formation of nitrogen oxides (NOx) can happen. Plenty of NOX reducing catalytic and chemical treatments have been developed for reducing NOx content of exhausted flue gases of different types of combustion processes. In general, flue gas handling is more expensive than NOx reduction within the combustion zone.

The formation of NOx in coal, gas and oil flames has been extensively studied. One of the key factors in NOx formation is combustion temperature. Generation of nitrogen monoxide is irrelevant phenomenon at temperatures below 760° C. Nitrogen and oxygen molar concentrations and combustion temperature are the main factors relating to thermal NOx formation. Thermal formation of NO begins already at 650° C., but is not significant until 1300° C. For example publication of Timo Hakkarainen "Reduction of nitrogen oxide emissions in lime kiln" considers many ways to resolve the problems of lime kilns. Different fuels produce different flame temperature profiles. Most usual fuel used at pulp mills, natural gas, results in higher peak temperatures of gas compared to for example heavy oil fuel. Combustion temperature may be reduced by using mixtures rich in fuel to limit the amount of oxygen available, using lean fuel mixtures to limit temperature by reducing energy input, injecting cooled low oxygen content flue gas into the combustion air, injecting cooled flue gas with added fuel or injecting water or steam. Reducing peak temperatures using water spray increases heat consumption.

Steam/water injection is only recommended for cement kilns, but not for lime kilns, because the raw material is normally wet and needs extensive drying and preheating. Injecting cooled flue gas is considered a technically infeasible control technology for lime kilns because of excessive reduction of flame temperature and thus weakened lime quality.

US2019093950 and U.S. Pat. No. 5,746,144 describes secondary combustion phase processes. Secondary combustion allows that the primary combustion zone can have lower combustion temperature but combined heat input can be higher. The U.S. Pat. No. 5,746,144 also suggests injecting lime or other substances to the secondary combustion phase for reducing sulfur oxide emissions.

SUMMARY OF THE INVENTION

As NOx emission requirements will become stricter and cost of emissions can raise, there is a strong need to have an efficient method for reducing NOx emissions of lime kilns. The emission requirements will prevent raising capacity of a lime kiln when other bottlenecks of a pulp plant are opened. Thus the lime kiln will hinder improving the capacity of the whole plant. Known NOx reducing methods will result to decreased fuel economy and thus increase carbon dioxide emissions or they have other disadvantages.

A high-temperature flame causes high level of radiation of thermal energy, which is absorbed by refractory tile lining of the rotary kiln. Especially the tiles around the flame will be under constantly changing high thermal stresses and may deteriorate and detach due to the high cyclic thermal radiation. Such radiation can also raise the surface of the tiles to a level which causes melting of calcium oxide particles on them. Melted particles are not chemically reactive components of white liquor and so the melting should be avoided.

The new invention aims to reduce combustion temperature and thermal radiation within a lime kiln of a pulp production plant. The rotary kiln has a rotary kiln tube internally covered with refractory tiles and it has a burner at lower end of the kiln tube. The burner is supplied by fuel for heating interior of the tube by a flame. The reduction of combustion temperature and/or thermal radiation around the flame is achieved by supplying calcium carbonate containing particles to the flame and/or to surrounding area around the flame. The particles will form the end product i.e. calcium oxide. The reaction is endothermic and will cool the flame. Heating up the supplied dust particles also takes energy from the flame. A cooler flame will also radiate less energy around it. Dust particles surrounding areas around the flame will filter thermal radiation and limit the temperature levels on the tiles, which are directly affected by the radiation.

These and other objects that will be apparent from the following summary and description are achieved by a method according to the appended claims. The invention enables a higher heat input and thus production rate without undesired side effects.

Fuel economy is not compromised as both the reaction and the heating of the particles are preferred effects and they would normally happen to the treated material anyway. The heated dust particles will effectively transfer their heat energy to surrounding gases, which will transfer their energy to treated calcium carbonate bed. The particles will also radiate thermal energy to the treated material bed when they flow upwards within the kiln. All the taken energy that reduces the temperature of the flame is thus conserved efficiently for making the product, not lost like when spraying steam or water. Any residual water of the supplied particles will vaporize to steam and cool the temperatures, but the same energy would be needed to evaporate the water from the supplied particles at prior stages. Still, it is more energy efficient to use preheaters to dry the supplied material than supplying wet particles in order to reduce the flame temperature.

According to the invention, a part of the processed raw material is supplied to the hot end of the kiln as small particles. Small particles have plenty of surface for reaction and convection of heat. The rate of supply of the particles is preferably controlled by measuring level of NOx emissions, quality of product and/or observing the temperature and/or form of the flame.

Lime kilns do not normally burn high sulfur content fuel. The fuels should be clean of contaminants, which can enrich within the chemical circulation of the pulp plant. That is why hot flame producing gaseous fuels like methane and hydrogen are preferred. The invention may also result to reduction of sulfur dioxides from flue gases. The invention may be used in combination with other known NOx reducing practices, but the temperature profile and overall energy input of the flame have to be kept sufficient for completing reactions of treated calcium carbonate. In practice, two phase combustion, which is common in cement kilns for suppressing NOx formation, is not an available option with lime kilns of pulp plants.

The supplied particles will achieve best efficiency when their flow is directed to the upper part of the flame where the temperature will be highest. When calcium oxide and/or calcium carbonate containing particles are supplied into the rotary kiln to areas surrounding the flame, the flow of supplied particles should be directed at least to area over the flame and/or to the area at the side of the flame where refractory tiles of the kiln are rotating downwards. There the tiles are not covered by processed material and the reduction of thermal radiation is most beneficial.

The particles are preferably supplied to the kiln from a flue gas dust separating device such as a cyclone and/or an electrostatic precipitator. The transport of the particles is preferably made by pneumatic conveying means. The carrying gas may be flue gas or combustion air. The particles can be directed into the kiln tube with primary combustion air or preferably at least one lance which can be designed and adjusted for optimal directing and spreading properties. Preferably, the nozzle of the lance has an outwards increasing internal cross sectional area at least when the intention is to spread the particles widely around the flame. To areas surrounding the flame, the particles may also be supplied with secondary combustion air.

The source of supplied particles may also be added raw material, which may be ground to suitable sized particles. Then they do not need to be transported a long way from the other end of the rotary kiln. Supplied calcium carbonate should be so dry that it will act as dry powder. It may also be in granular form and water content would then evaporate within the interior of the kiln and/or the flame to dust. The granules should be very small in order to be effectively spread around in dust like form. If the particles would be supplied to the kiln in sludge form, the reduction of combustion temperature would mainly be based on the evaporation of water. Lime sludge would be difficult to spread around effectively and evenly. Water content of supplied calcium carbonate should be less than 25% per weight and preferably less than 15% for achieving small enough dust creating particles and their even spreading.

LIST OF DRAWINGS

Examples of embodiments of the invention will now be described in more detail with reference to the appended drawings in which:

FIG. 1. illustrates a side view of an embodiment of the invention and

Figure 2:
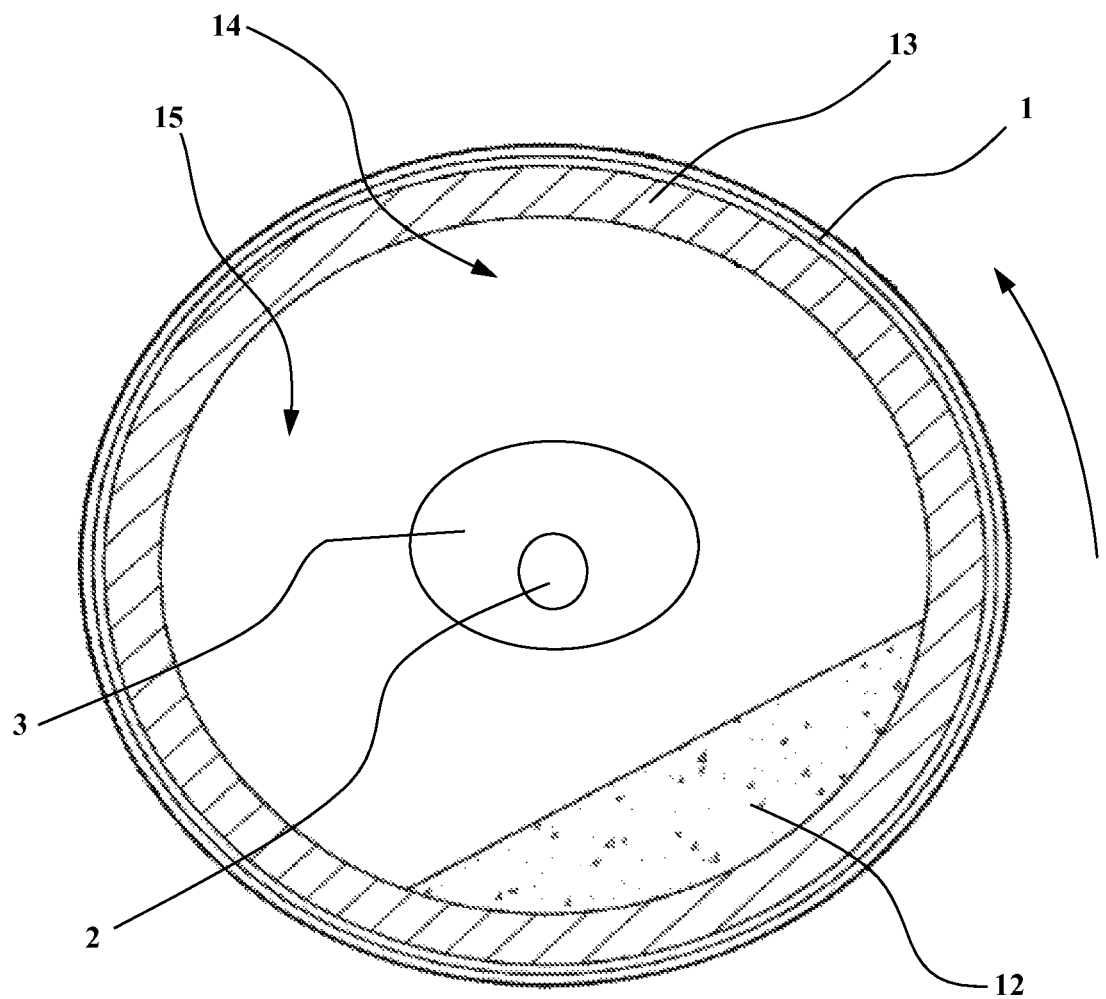

FIG. 2 illustrates a cut view of the interior of the kiln tube.

DETAILED DESCRIPTION OF THE INVENTION

U.S. Pat. No. 5,667,582 describes a prior at solution for blowing calcium oxide and/or calcium hydroxide dust as an additive to a cement kiln for reacting with sulfur oxides of exhausted gases. The aim is to blow the dust with high speed from the lower end of the kiln over the flame to the area after the flame, where the whole upper part of the kiln can act as a reaction zone for the additive. The aim of the present invention is opposite. It aims to supply calcium carbonate particles to flame area and/or to area surrounding the flame for realizing the benefits of the invention. The elements of the rotary kiln are still quite similar, but as the particles are directed and supplied close to the burner end of the kiln tube, the effects are very different. Our invention can achieve protection of refractory tiles of the kiln tube and reduction of the highest temperatures of the flame.

FIG. 1. illustrates a preferred embodiment for reducing generation of NOx and thermal radiation within a lime kiln having a rotary kiln tube 1. A longitudinal flame 3 is generated within the center of the kiln tube 1 by supplying compressed primary air 8 and fuel to a burner 2 having concentric tubes for supplied fluids. The burner is attached to lower, stationary end of the kiln. Calcium carbonate particles are blown with combustion air 6, 8 or other fluids to the flame 3 and/or area surrounding the flame 3. The feeding parameters like velocity of carrying gas and circulating motion of primary combustion air 8 are set to achieve a cloud of dust particles within the targeted area within and/or around the flame. The endothermic dissolution reaction of calcium carbonate to calcium oxide and carbon dioxide will happen within and around the flame 3 so that high temperature profile peak is smoothed to temperature levels which lowers NOx formation to acceptable levels.

The particles are preferably supplied to the flame by at least one lance 9. The particles can also be supplied via primary combustion air 8 channels of the burner 2. Secondary combustion air 6 is supplied around the burner 2 for completing the combustion. The secondary combustion air 6 is preheated by a preheater 5, which is around the burner end of the kiln tube 1. The preheater 5 also cools discharged product 1 which is granules of calcium oxide. The mixture and feeding parameters of the primary 8 and secondary combustion air 6 will also affect to formation of NOx.

The supplied particles are preferably taken from dust separators of exhaust gas. The particles are bigger from a cyclone than taken from an electrostatic precipitator. Those particles are very dry and the source can be chosen for optimizing the process. Internally circulating and externally added raw material may also be ground or otherwise prepared for the supply of the particles.

The particles are preferably supplied to flame 3 by at least one separate lance 9 over the burner 2. The lance 9 directs the flow of conveying air or other fluid and particles preferably mostly to the upper half of the flame 3 wherein the temperature peak is highest.

FIG. 2. shows a transversally cut view of the interior of the kiln tube 1 for illustrating the preferred positions 14 and 15 where the particles should be supplied and spread. For filtering radiation energy absorbed by the refractory tiles 13 next to the flame 3, the particles can be supplied to areas between the flame 3 and the refractory tiles 13 surrounding the flame 3 area also or instead of supplying them to the flame 3. Preferably the nozzle 10 of the lance 9 has an outwards increasing internal cross sectional area so that the velocity of carrying fluid and supplied particles are reduced to a level which creates a cloud of dust particles at the burner 2 end of the kiln tube 1. The particles do not need to be supplied under the flame 3 nor to the rising side of the rotary kiln tube 1 where the refractory tiles 13 are covered by the particles of the bed 12 of treated material. At areas covered by the bed 12, the radiation is useful as it will finalize the reactions of the treated material. For the radiation filtering purpose, there is no need to lower the temperature of the areas surrounding the flame 3 by the dissolution reaction of calcium carbonate, so the supplied particles for the purpose can be for example discharged calcium oxide. The particles which are supplied only for reducing radiation, should be supplied by at least one separate lance 9.

The amount of blown particles can be more than needed for the reduction of the temperature of the flame 3, especially when it is not supplied to the flame 3 area but spread widely within the burner 2 end of the kiln. Still heat output of the flame 3 can be kept within sufficient level for achieving full calcination of fed raw material as the supplied particles will absorb the radiation and will spread the absorbed energy to treated material within the kiln tube 1.

The invention claimed is:

1. A method for reducing combustion temperature and/or thermal radiation within a lime kiln of a pulp production plant, wherein the lime kiln is a rotary kiln having a rotary kiln tube internally covered with refractory tiles and a burner attached to a burner end of the rotary kiln, the method comprising:
   supplying the burner with fuel;
   heating the rotary kiln tube by a flame produced by the burner burning the fuel;
   supplying particles containing calcium carbonate to the lime kiln and introducing the particles into the rotary kiln tube at an upper portion of the flame, and
   reducing the combustion temperature and/or the thermal radiation within the rotary kiln tube by the supplying of the particles containing calcium carbonate to the flame.

2. The method of claim 1, wherein the step of supplying the particles includes supplying at least some of the particles from lance extending beyond the burner end and into an interior of the rotary kiln tube and having a discharge end at an elevation above the flame.

3. The method of claim 2, wherein the discharge end of the lance includes a nozzle having an outwardly increasing internal cross sectional area, and the flow of the particles flows through the nozzle.

4. The method of claim 3, wherein the flow of the particles from the nozzle is directed to area within the rotary kiln at an elevation above the flame.

5. The method of claim 1, wherein the fuel of the burner is gaseous.

6. The method of claim 1, wherein the fuel includes methane and/or hydrogen.

7. The method of claim 1, wherein at least some of the particles supplied to the rotary kiln are obtained from a dust separating device.

8. The method of claim 1, wherein at least some of the particles supplied to the rotary kiln are ground to particles from supplied raw material.

9. The method of claim 1, wherein the step of supplying the particles includes supplying the particles with primary combustion air and/or secondary combustion air supplied to the burner of the rotary kiln.

10. The method of claim 1, wherein the combustion is performed only in one phase.

11. The method of claim 1, wherein a rate of supply of the particles is controlled by at least one of: measuring a level of NOx emissions, measuring a quality of product, measuring a temperature of the flame or an observed form of the flame.

12. The method of claim 1, wherein the particles supplied to the flame have no more than 25% per weight water content.

13. The method of claim 1, wherein the particles supplied to the flame have no more than 15% per weight water content.

14. A method to suppress combustion temperature and/or thermal radiation of a burner flame within a lime kiln in a pulp production plant, wherein the lime kiln includes a rotary kiln tube internally covered with refractory tiles and a burner at an end of the rotary kiln, the method comprising:
   supplying the burner with fuel;
   directing a flame of the burner into the rotary kiln tube, wherein the flame is generated by the burner burning the fuel;
   conveying particles containing calcium carbonate from outside of the lime kiln to the rotary kiln tube,
   introducing the particles containing calcium carbonate into the rotary kiln tube to direct the particles to flow to an upper portion of the flame, and
   reducing the combustion temperature and/or the thermal radiation within the lime kiln by the particles containing calcium carbonate reacting with the flame.

15. The method of claim 14, wherein the introducing of the particles containing calcium carbonate is performed using a lance through which the particles flow from outside of the lime kiln to inside of the rotary kiln tube, wherein the particles are discharged from a distal end of the lance into and/or above the flame.

* * * * *